United States Patent Office 3,211,793 Patented Oct. 12, 1965

1

3,211,793
N,N',N-TRISUBSTITUTED p-PHENYLENEDIAMINE

Ernst Roos, Cologne-Flittard, Germany, assignor to Farbenfabriken Bayer Aktiengesellschaft, Leverkusen, Germany, a German corporation No Drawing. Filed Jan. 18, 1962, Ser. No. 167,181
Claims priority, application Germany, Jan. 20, 1961, F 33,021
5 Claims. (Cl. 260—577)

The present invention relates to new antioxidants for natural and synthetic rubber as well as for fuels and oils; the invention is further concerned with a process of producing the new antioxidants.

In accordance with the invention it has been found that N,N',N-trisubstituted p-phenylenediamines are obtained by reacting 1 mol of an N,N'-disubstituted p-phenylenediamine with about 1 mol of isobutyraldehyde, preferably an excess quantity of isobutyraldehyde, at elevated temperature and continuously distilling off the water formed in the reaction.

The new compounds of the invention can be represented by the following general formula:

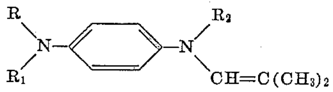

wherein R stands for hydrogen, alkyl, cycloalkyl, aryl and substituted aryl radicals, $R_1$ for alkyl, cycloalkyl, aryl and substituted aryl radicals, and $R_2$ for alkyl and cycloalkyl radicals. It is preferable to use alkyl radicals containing up to 12 carbon atoms, while the cyclohexyl radical, which may be substituted by alkyl radicals, preferably lower alkyl radicals, is especially suitable as cycloalkyl radical. The phenyl radical which may be substituted by hydrocarbon radicals such as lower alkyl radicals, or by lower alkoxy radicals such as methoxy and ethoxy radicals, is preferably used as aryl radical. The aryl radical may contain substituted amino groups, for instance alkyl amino groups such as methyl-, ethyl- and propyl-amino groups, as well as cycloalkyl-amino groups such as cyclo-hexylamino groups and aralkyl- or aryl-amino groups.

The new antioxidants according to the invention are obtainable by a reaction which can be represented by the following equation in which N,N'-di-sec.-butyl-p-phenylenediamine (R being —$CH(CH_3)$—$CH_2$—$CH_3$) and isobutyraldehyde are reacted.

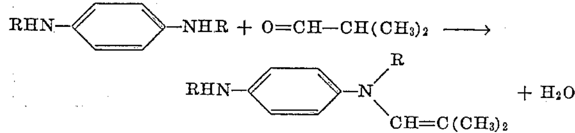

The N,N',N'-trisubstituted p-phenylenediamines are surprisingly obtained according to the herein described process even if isobutyraldehyde is used in a relatively large excess.

The p-phenylenediamine derivatives used in the process of the invention may be substituted at the two nitrogen atoms in accordance with the above general formula by equal or different alkyl, isoalkyl, cycloalkyl, aralkyl or aryl radicals which may carry further substituents. The alkyl radicals preferably contain up to 12 carbon atoms. These disubstituted p-phenylenediamine derivatives are obtainable according to conventional processes, for instance by the reductive alkylation of corresponding p-phenylenediames with aldehydes or ketones.

The process of the invention may be carried out in an inert solvent, preferably in a solvent yielding with water azeotropically boiling mixtures, so that the water formed in the reaction can be azeotropically distilled off in simple manner. Isobutyraldehyde may also be used as solvent; in this case isobutyraldehyde is employed in a large excess. Isobutyraldehyde is preferably used in quantities of 1.5–6 mols per mol of p-phenylenediamine. The course of the reaction can easily be determined by the amount of water distilled off. The reaction is complete as soon as the theoretical amount of water has been formed.

2

The condensation can be accelerated by adding small quantities of dehydration catalysts for instance p-toluene sulfonic acid.

The new compounds produced by the process of the invention are in general distillable, colorless or yellow-colored oils which darken by oxidation upon standing in the atmosphere. The alkenyl radicals can be converted into saturated alkyl groups by catalytic hydrogenation without nuclear hydrogenation of the p-phenylenediamine ring occurring.

The new compounds of the invention are valuable antioxidants for vulcanizates prepared from natural and synthetic rubber as well as oxidation inhibitors for fuels and oils.

The invention is further illustrated by the following examples without being restricted thereto.

EXAMPLE 1

*N,N'-diethyl-N'-isobutenyl-p-phenylenediamine*

82 g. (0.5 mol) of N,N'-diethyl-p-phenylenediamine, 72 g. (1 mol) of isobutyraldehyde and 500 ml. of commercial gasoline are heated under gentle reflux while the water is continuously separated from the returned condensate and collected in Dean-Stark water separator for 1½ hours, until 9 ml. (0.5 mol) of water is collected. After distilling the solution up to 100° C. at 15 mm. Hg the residue is distilled in high vacuum.

Yield: 103 g.=94.5% of the theoretical; B.P. 108–123° C. at 0.09 mm. Hg.

$C_{14}H_{22}N_2$ molecular weight: 2.18.
Calculated: C, 77.06; H, 10.09; N, 12.84.
Found: C, 76.2; H, 10.0; N, 13.3.

EXAMPLE 2

*N,N'-diisopropyl-N'-isobutenyl-p-phenylenediamine*

96 g. (0.5 mol) of N,N'-diisopropyl-p-phenylenediamine, 72 g. (1 mol) of isobutyraldehyde and 500 ml. of commercial gasoline are heated under gentle reflux while the water is continuously separated from the returned condensate and collected in a Dean-Stark water separator for 5½ hours until 9 ml. (0.5 mol) of water is collected. The reaction mixture is distilled up to 100° C. at 15 mm. Hg, and the residue is distilled in high vacuum.

Yield: 109 g.=88.5% of the theoretical; B.P. 111–128° C. at 0.09 mm. Hg.

$C_{16}H_{26}N_2$ molecular weight: 246.
Calculated: C, 78.05; H, 10.57; N, 11.38.
Found: C, 77.7; H, 10.8; N, 11.4.

EXAMPLE 3

*N,N'-di-sec.-butyl-N'-isobutenyl-p-phenylenediamine*

110 g. (0.5 mol) of N,N'-di-sec.-butyl-p-phenylenediamine, 216 g. (3 mol) of isobutyraldehyde, 500 ml. of commercial gasoline and 5 g. of p-toluenesulfonic acid are heated under gentle reflux while the water is continuously separated from the returned condensate and collected in a Dean-Stark water separator until 9 ml. (0.5 mol) of water is collected. After distilling the solution up to 100° C. at 15 mm. Hg the residue is distilled in high vacuum.

Yield: 115 g.=84% of the theoretical; B.P. 140–155° C. at 0.3 mm. Hg.

$C_{18}H_{30}N_2$ molecular weight: 274.
Calculated: C, 78.83; H, 10.95; N, 10.22.
Found: C, 78.6; H, 10.9; N, 10.2.

EXAMPLE 4

*N,N'-di-sec.-octyl-N'-isobutenyl-p-phenylenediamine*

166 g. (0.5 mol) of N,N'-di-sec.-octyl-p-phenylenediamine, 216 g. (3 mol) of isobutyraldehyde, 500 ml. of commercial gasoline and 5 g. of p-toluenesulfonic acid are heated under gentle reflux while the water is continuously separated from the returned condensate and collected in a Dean-Stark water separator until 9 ml. (0.5 mol) of water is collected. After distilling the solution up to 100° C. at 15 mm. Hg the residue is distilled in high vacuum.

Yield: 167 g.=82% of the theoretical; B.P. 194–204° C. at 0.4 mm. Hg.
$C_{26}H_{46}N_2$ molecular weight: 406.
Calculated: C, 81.38; H, 12.29; N, 6.33.
Found: C, 81.4; H, 12.0; N, 6.8.

EXAMPLE 5

*N,N'-dicyclohexyl-N'-isobutenyl-p-phenylenediamine*

272 g. (1 mol) of N,N'-dicyclohexyl-p-phenylenediamine, 79 g. (1 mol) of isobutyraldehyde, 500 ml. of commercial gasoline and 5 g. of p-toluenesulfonic acid are heated under gentle reflux while the water is continuously separated from the returned condensate and collected in a Dean-Stark water separator until 18 ml. (1 mol) of water is collected, After distilling the solution up to 100° C. at 15 mm. Hg the residue is distilled in high vacuum.

Yield: 191 g.=59% of the theoretical; B.P. 176–181° C. at 0.1 mm. Hg.
$C_{22}H_{34}N_2$ molecular weight: 326.
Calculated: C, 80.92; H, 10.50; N, 8.58.
Found: C, 80.6; H, 10.5; N, 8.5.

EXAMPLE 6

*N-phenyl-N'-methyl-N'-isobutenyl-p-phenylenediamine*

99 g. (0.5 mol) of N-phenyl-N'-methyl-p-phenylenediamine, 39 g. (0.55 mol) of isobutyraldehyde, 500 ml. of toluene and 4 g. of p-toluenesulfonic acid are heated under gentle reflux while the water is continuously separated from the returned condensate and collected in a Dean-Stark water separator until 9 ml. (0.5 mol) of water is collected. After distilling the solution up to 100° C. at 15 mm. Hg the residue is distilled in high vacuum.

Yield: 80 g.=63% of the theoretical; B.P. 145–160° C. at 0.1 mm. Hg.
$C_{17}H_{20}N_2$ molecular weight: 252.
Calculated: C, 80.92; H, 7.97; N, 11.11.
Found: C, 80.8; H, 7.8; N, 11.7.

EXAMPLE 7

*N-phenyl-N'-isopropyl-N'-isobutenyl-p-phenylenediamine*

113 g. (0.5 mol) N-phenyl-N'-isopropyl-p-phenylenediamine, 72 g. (1 mol) of isobutyraldehyde, 500 ml. of xylene and 2 g. of p-toluenesulfonic acid are heated under gentle reflux while the water is continuously separated from the returned condensate and collected in a Dean-Stark water separator until 9 ml. (0.5 mol) of water is collected. The reaction mixture is distilled up to 100° C. at 15 mm. Hg, the residue is distilled in high vacuum.

Yield: 121 g.=86.5% of the theoretical; B.P. 172–175° C. at 0.19 mm. Hg.
$C_{19}H_{24}N_2$ molecular weight: 280.
Calculated: C, 81.38; H, 8.63; N, 9.99.
Found: C, 81.3; H, 8.7; N, 9.9.

EXAMPLE 8

*N-phenyl-N'-cyclohexyl-N'-isobutenyl-p-phenylenediamine*

133 g. (0.5 mol) of N-phenyl-N'-cyclohexyl-p-phenylenediamine, 72 g. (1 mol) of isobutyraldehyde, 500 ml. of light gasoline and 2 g. of p-toluenesulfonic acid are heated under gentle reflux while the water is continuously separated from the returned condensate and collected in a Dean-Stark water separator until 9 ml. (0.5 mol) of water is collected. The reaction solution is distilled up to 100° C. at 15 mm. Hg, and the residue is distilled in high vacuum.

Yield: 124 g.=77.5% of the theoretical; B.P. 206–207° C. at 13 mm. Hg.
$C_{22}H_{28}N_2$ molecular weight: 320.
Calculated: C, 82.45; H, 8.81; N, 8.74.
Found: C, 82.1; H, 8.7; N, 8.9.

EXAMPLE 9

The following mixtures which may be used in the manufacture of tire treads are prepared on the roller:

| | IA | IB | IC | ID | IE |
|---|---|---|---|---|---|
| Oil-extended styrene-butadiene rubber, 37.5 parts of oil per 100 parts of elastomer | 100 | 100 | 100 | 100 | 100 |
| Zinc oxide | 5 | 5 | 5 | 5 | 5 |
| Intermediate super abrasion furnace carbon black | 55 | 55 | 55 | 55 | 55 |
| Mineral oil plasticizer | 4 | 4 | 4 | 4 | 4 |
| Paraffin wax | 0.6 | 0.6 | 0.6 | 0.6 | 0.6 |
| Stearic acid | 2 | 2 | 2 | 2 | 2 |
| 2-benzothiazyl-N-cyclohexyl-sulfenamide | 0.6 | 0.6 | 0.6 | 0.6 | 0.6 |
| N-phenyl-N'-isopropyl-p-phenylenediamine | | 3 | | | |
| N,N'-diisopropyl-N'-isobutenyl-p-phenylenediamine | | | 3 | | |
| N,N'-di-sec.-butyl-N'-isobutenyl-p-phenylenediamine | | | | 3 | |
| N,N-diisooctyl-N'-isobutenyl-p-phenylendiamine | | | | | 3 |

Test samples (0.4 x 4.5 x 4.5 cm.) of the above mixtures are vulcanized in a press at 151° C. for 30 minutes. The test samples are then stretched by placing them in a plastic frame in such a manner that an elongation of 60% results on the surface of the test samples. The stretched test samples are treated with an air current containing 25 parts of ozone per 100 million parts of air. The amount of air passed through per hour is 4 m.³; the air treatment is carried out for 100 hours. At certain time intervals which are indicated in the table below, the cracks formed are evaluated, i.e., both the total number of cracks which are visible with the naked eye and the average length of the cracks in accordance with the following rating schedules:

| Number of cracks | | Average length of cracks | |
|---|---|---|---|
| No cracking | 0 | | 0 |
| 1–3 cracks | 1 | Cracks just visible up to 1 mm. | 1 |
| 4–9 cracks | 2 | 1–3 mm | 2 |
| 10–27 cracks | 3 | 3–8 mm | 3 |
| 28–81 cracks | 4 | Over 8 mm | 4 |
| 82–243 cracks | 5 | | |
| Over 244 cracks | 6 | | |

In the table below the figures indicating the number of cracks and the average length thereof are separated by a diagonal line. The first figures indicate the number of cracks.

| | Evaluation after— | | | | | | |
|---|---|---|---|---|---|---|---|
| Hours | 1 | 5 | 10 | 20 | 40 | 70 | 100 |
| Mixture No.: | | | | | | | |
| IA | 6/1 | 6/1 | 6/1 | 6/2 | 5/2 | 5/2 | 5/2 |
| IB | 0/0 | 0/0 | 2/1 | 2/2 | 2/2 | 2/2 | 2/2 |
| IC | 0/0 | 0/0 | 0/0 | 0/0 | 0/0 | 0/0 | 0/0 |
| ID | 0/0 | 0/0 | 0/0 | 0/0 | 0/0 | 0/0 | 0/0 |
| IE | 0/0 | 0/0 | 0/0 | 0/0 | 0/0 | 0/0 | 0/0 |

EXAMPLE 10

The following mixtures are prepared on a roller mill:

| | IA | IB | IC | ID | IE | IF |
|---|---|---|---|---|---|---|
| Smoked sheets | 100 | 100 | 100 | 100 | 100 | 100 |
| Reclaimed tire rubber | 65 | 65 | 65 | 65 | 65 | 65 |
| Fast extruding furnace carbon black | 37 | 37 | 37 | 37 | 37 | 37 |
| Chalk | 53 | 53 | 53 | 53 | 53 | 53 |
| Sulfur | 2.75 | 2.75 | 2.75 | 2.75 | 2.75 | 2.75 |
| 2-mercaptobenzthiazole | 1.1 | 1.1 | 1.1 | 1.1 | 1.1 | 1.1 |
| Tetramethylthiuramdisulfide | 0.1 | 0.1 | 0.1 | 0.1 | 0.1 | 0.1 |
| Stearic acid | 2 | 2 | 2 | 2 | 2 | 2 |
| Paraffin wax | 0.75 | 0.75 | 0.75 | 0.75 | 0.75 | 0.75 |
| N-phenyl-N'-isopropyl-p-phenylenediamine | | 1 | | | | |
| N,N'-diisopropyl-N'-isobutenyl-p-phenylenediamine | | | 1 | | | |
| N,N'-di-sec.-butyl-N'-isobutenyl-p-phenylenediamine | | | | 1 | | |
| N,N'-dicyclohexyl-N'-isobutenyl-p-phenylenediamine | | | | | 1 | |
| N-phenyl-N'-isopropyl-N'-isobutenyl-p-phenylenediamine | | | | | | 1 |

Test samples having a size of 4 x 200 x 25 millimeters are heated in the press at 151° C. for 10 minutes. The samples are loaded on one side with 2.5 kg., while the free end of the samples is placed across a shaft and fixed to an eccentric which moves up and down. The samples are then moved to and fro across the moving shaft at a frequency of 6 motions per minute for 7 and 14 days respectively. The resulting crack formation is then compared with the following rating schedule:

Pronounced crack formation ---- 3
Moderate crack formation ---- 2
Slight crack formation ---- 1
No crack formation ---- 0

The following results were obtained:

| Mixture No. | IIA | IIB | IIC | IID | IIE | IIF |
|---|---|---|---|---|---|---|
| Evaluation after 7 days | 2.5 | 0.5 | 0 | 0 | 0.5 | 0.5 |
| Evaluation after 14 days | 3.0 | 1.0 | 0.5 | 0-0.5 | 0.5 | 1.0 |

I claim:

1. A compound having the formula:

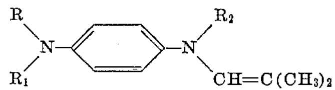

in which R is a radical of the group consisting of hydrogen, alkyl containing up to 12 carbon atoms, cyclohexyl, lower alkyl cyclohexyl, phenyl, alkylphenyl and alkoxyphenyl; $R_1$ is a member selected from the group consisting of alkyl containing up to 12 carbon atoms, cyclohexyl, lower alkylcyclohexyl, phenyl, alkylphenyl and lower alkoxyphenyl; and $R_2$ is a member selected from the group consisting of alkyl containing up to 12 carbon atoms, cyclohexyl and lower alkyl-substituted cyclohexyl.

2. N,N'-diisopropyl-N'-isobutenyl-p-phenylenediamine.

3. N,N'-di-sec.-butyl-N'-isobutenyl-p-phenylenediamine.

4. N,N'-dicyclohexyl-N'-isobutenyl-p-phenylenediamine.

5. N-phenyl-N'-isopropyl-N'-isobutenyl-p-phenylenediamine.

References Cited by the Examiner

UNITED STATES PATENTS 2,883,362 4/59 Rosenwald et al. ---- 260—577 X
2,902,466 9/59 Rosenwald et al. ---- 260—577 X
2,929,797 3/60 Albert ---- 260—577 X CHARLES B. PARKER, *Primary Examiner.*

JOSEPH P. BRUST, *Examiner.*